(12) United States Patent
Patton et al.

(10) Patent No.: US 10,261,846 B1
(45) Date of Patent: Apr. 16, 2019

(54) STORING AND VERIFYING THE INTEGRITY OF EVENT RELATED DATA

(71) Applicant: Banjo, Inc., Park City, UT (US)

(72) Inventors: Damien Patton, Park City, UT (US); Rish Mehta, Redwood City, UT (US)

(73) Assignee: Banjo, Inc., Park City, UT (US)

( * ) Notice: Subject to any disclaimer, the term of this patent is extended or adjusted under 35 U.S.C. 154(b) by 0 days.

(21) Appl. No.: 16/121,847

(22) Filed: Sep. 5, 2018

Related U.S. Application Data

(60) Provisional application No. 62/664,001, filed on Apr. 27, 2018, provisional application No. 62/660,912, filed on Apr. 20, 2018, provisional application No. 62/654,274, filed on Apr. 6, 2018, provisional application No. 62/654,277, filed on Apr. 6, 2018, provisional application No. 62/628,866, filed on Feb. 9, 2018.

(51) Int. Cl.
| | |
|---|---|
| *G06F 9/50* | (2006.01) |
| *G06F 9/54* | (2006.01) |
| *G06F 21/62* | (2013.01) |
| *H04L 12/24* | (2006.01) |
| *H04L 29/06* | (2006.01) |
| *G06F 16/182* | (2019.01) |

(52) U.S. Cl.
CPC ............ *G06F 9/542* (2013.01); *G06F 9/5005* (2013.01); *G06F 16/182* (2019.01); *G06F 21/6245* (2013.01); *H04L 41/145* (2013.01); *H04L 63/123* (2013.01)

(58) Field of Classification Search
CPC .. G06F 9/542; G06F 9/5005; G06F 17/30194; G06F 21/6245; H04L 63/123; H04L 41/145
See application file for complete search history.

(56) References Cited

U.S. PATENT DOCUMENTS

| | | |
|---|---|---|
| 8,161,504 B2 | 4/2012 | Newell |
| 8,208,798 B2 | 6/2012 | Jung et al. |
| 8,380,050 B2 | 2/2013 | Kummer |
| 8,396,467 B2 | 3/2013 | Bonnefoy et al. |
| 8,782,041 B1 | 7/2014 | Daniel |

(Continued)

OTHER PUBLICATIONS

Office Action received in U.S. Appl. No. 16/131,637, dated Nov. 28, 2018, 37 pages.

(Continued)

*Primary Examiner* — Charles E Anya
(74) *Attorney, Agent, or Firm* — Michael B. Dodd

(57) ABSTRACT

The present invention extends to methods, systems, and computer program products for storing and validating the integrity of event related information. To facilitate auditing and traceability, raw signals, normalized signals, detected events, event expirations, and event notifications can be stored in a queryable distributed ledger (e.g., a blockchain). Personal information can be stripped (or otherwise rendered inert, for example, unrecognizable, unreproducible, etc.) prior to storage into the distributed ledger minimizing the possibility of a person being identified. Ledger data can be used to verify actual data as well as for forensics purposes, such as, to audit data, recreate events, etc., in view of an error or inconsistency to investigate, diagnose, remediate, etc.

15 Claims, 6 Drawing Sheets

(56) References Cited

U.S. PATENT DOCUMENTS

| | | |
|---|---|---|
| 8,938,089 B1 | 1/2015 | Postelnicu et al. |
| 9,106,804 B2 | 8/2015 | Roberts et al. |
| 9,158,974 B1 | 10/2015 | Laska et al. |
| 9,230,250 B1 | 1/2016 | Parker et al. |
| 9,324,093 B2 | 4/2016 | Setty et al. |
| 9,449,229 B1 | 9/2016 | Laska et al. |
| 9,466,196 B2 | 10/2016 | Smith et al. |
| 9,466,197 B2 | 10/2016 | Hildick-Pytte |
| 9,501,915 B1 | 11/2016 | Laska et al. |
| 9,609,380 B2 | 3/2017 | Laska et al. |
| 9,613,068 B2 | 4/2017 | Tsirogiannis et al. |
| 9,680,919 B2 | 6/2017 | McDaid et al. |
| 9,699,523 B1 | 7/2017 | Cronin et al. |
| 9,703,827 B2 | 7/2017 | Clark et al. |
| 9,753,913 B1 | 9/2017 | Kursun et al. |
| 9,858,322 B2 | 1/2018 | Theimer et al. |
| 9,880,769 B2 | 1/2018 | Chen et al. |
| 9,898,542 B2 | 2/2018 | Hayden |
| 9,940,580 B2 | 4/2018 | Faith et al. |
| 9,992,248 B2 | 6/2018 | Fox et al. |
| 10,034,029 B1 | 7/2018 | Barua et al. |
| 10,043,006 B2 | 8/2018 | Puri et al. |
| 10,043,551 B2 | 8/2018 | Anderson et al. |
| 10,078,537 B1 | 9/2018 | Nanda et al. |
| 2005/0183143 A1 | 8/2005 | Anderholm et al. |
| 2006/0235833 A1 | 10/2006 | Smith et al. |
| 2006/0267783 A1 | 11/2006 | Smith |
| 2010/0166309 A1 | 7/2010 | Hull |
| 2011/0040760 A1 | 2/2011 | Fleischman et al. |
| 2011/0311140 A1 | 12/2011 | Urbach et al. |
| 2012/0023245 A1 | 1/2012 | Mouquet et al. |
| 2012/0259842 A1 | 10/2012 | Oman et al. |
| 2013/0006627 A1 | 1/2013 | Guthery et al. |
| 2013/0083036 A1 | 4/2013 | Cario et al. |
| 2013/0214925 A1 | 8/2013 | Weiss |
| 2014/0025781 A1 | 1/2014 | Ye et al. |
| 2014/0067951 A1 | 3/2014 | Sheinfeld |
| 2014/0088744 A1 | 3/2014 | Levien et al. |
| 2014/0328570 A1 | 11/2014 | Cheng et al. |
| 2015/0095333 A1 | 4/2015 | Porpora et al. |
| 2015/0220835 A1 | 8/2015 | Wilson et al. |
| 2015/0294233 A1 | 10/2015 | Aultman et al. |
| 2016/0139242 A1 | 5/2016 | Dupray et al. |
| 2016/0192166 A1* | 6/2016 | deCharms ............ H04W 4/021 348/14.02 |
| 2016/0267144 A1 | 9/2016 | Manimaran |
| 2016/0283860 A1 | 9/2016 | Pycock et al. |
| 2017/0011053 A1* | 1/2017 | Hubbard ................ H04L 67/20 |
| 2017/0032138 A1 | 2/2017 | Navda et al. |
| 2017/0115648 A1 | 4/2017 | Nixon et al. |
| 2017/0139393 A1* | 5/2017 | Boss ................... G05B 19/058 |
| 2017/0139956 A1 | 5/2017 | Qiao et al. |
| 2017/0142200 A1 | 5/2017 | Kodner et al. |
| 2017/0180944 A1 | 6/2017 | Bhatt |
| 2017/0257654 A1 | 9/2017 | Branch et al. |
| 2017/0318336 A1 | 11/2017 | Hackett et al. |
| 2017/0366896 A1 | 12/2017 | Adsumilli et al. |
| 2018/0101595 A1 | 4/2018 | Bastide et al. |
| 2018/0172454 A1 | 6/2018 | Ghadiok et al. |
| 2018/0176607 A1 | 6/2018 | Shaw et al. |
| 2018/0192158 A1 | 7/2018 | Smith et al. |
| 2018/0268868 A1 | 9/2018 | Salokannel et al. |
| 2018/0276054 A1* | 9/2018 | Furuichi ................ G06F 9/542 |
| 2018/0287797 A1* | 10/2018 | Banerjee ............... H04L 9/3239 |
| 2018/0300124 A1 | 10/2018 | Malladi et al. |
| 2018/0313798 A1* | 11/2018 | Chokshi ............... G01N 33/004 |

OTHER PUBLICATIONS

Office Action received in U.S. Appl. No. 16/121,917, dated Nov. 2, 2018, 20 pages.

Office Action received in U.S. Appl. No. 16/121,762, dated Nov. 19, 2018, 12 pages.

Office Action received in U.S. Appl. No. 16/106,530, dated Oct. 26, 2018, 15 pages.

Office Action received in U.S. Appl. No. 16/038,537, dated Oct. 19, 2018, 10 pages.

Office Action received in U.S. Appl. No. 16/106,436, dated Nov. 8, 2018, 15 pages.

Office Action received in U.S. Appl. No. 16/101,208, dated Nov. 14, 2018, 15 pages.

* cited by examiner

STORING AND VERIFYING THE INTEGRITY OF EVENT RELATED DATA

CROSS-REFERENCE TO RELATED APPLICATIONS

This application claims the benefit of U.S. Provisional Patent Application Ser. No. 62/628,866, entitled "Multi Source Validation", filed Feb. 9, 2018 which is incorporated herein in its entirety. This application claims the benefit of U.S. Provisional Patent Application Ser. No. 62/654,274, entitled "Detecting Events From Multiple Signals", filed Apr. 6, 2018 which is incorporated herein in its entirety. This application claims the benefit of U.S. Provisional Patent Application Ser. No. 62/654,277 entitled, "Validating Possible Events With Additional Signals", filed Apr. 6, 2018 which is incorporated herein in its entirety. This application claims the benefit of U.S. Provisional Patent Application Ser. No. 62/660,912, entitled "Using Distributed Ledger For Auditability/Traceability Of Signals And Detected Events", filed Apr. 20, 2018, which is incorporated herein in its entirety. This application claims the benefit of U.S. Provisional Patent Application Ser. No. 62/664,001, entitled, "Normalizing Different Types Of Ingested Signals Into A Common Format", filed Apr. 27, 2018, which is incorporated herein in its entirety.

This application is related to U.S. Provisional Patent Application Ser. No. 62/667,616, entitled, "Normalizing Different Types Of Ingested Signals Into A Common Format", filed May 7, 2018, which is incorporated herein in its entirety.

This application is related to U.S. Provisional Patent Application Ser. No. 62/682,176 entitled "Detecting An Event From Multiple Sources", filed Jun. 8, 2018 which is incorporated herein in its entirety.

This application claims the benefit of U.S. Provisional Patent Application Ser. No. 62/682,177 entitled "Detecting An Event From Multi-Source Event Probability", filed Jun. 8, 2018 which is incorporated herein in its entirety.

BACKGROUND

1. Background and Relevant Art

Many events are related to human suffering and possibly even human death, such as, for example, accidents, shootings, natural disasters, etc. Entities being notified of such events (e.g., drivers, first responders, disaster relief organizations, etc.) can tailor their response based on circumstances of an event. Thus, entities can rely on event notification when allocating and expending resources. Errors or inconsistencies in event detection and notification may cause entities to respond inappropriately, waste resources, etc. Event detection and notification systems can take a variety of measures to reduce the possibility of introducing errors or inconsistencies into event detection and notification processes. However, inevitably errors and/or inconsistencies can occur from time to time.

BRIEF SUMMARY

Examples extend to methods, systems, and computer program products for storing and verifying event related data. In one aspect, data is stored to a distributed ledger (e.g., block chain) during event evolution of event detection. One or more raw signals are received. The one or more raw signals are stored a distributed ledger One or more normalized signals area formulated from the one or more raw signals. The one or more normalized signals are stored in the distributed ledger. An event is detected from the one or more normalized signals. The event is stored in the distributed ledger. An event notification is created for the event. The event notification is stored in the distributed ledger. The event notification is sent to at least one entity.

In another aspect, event related data is verified through reference to the distributed ledger. An event notification is received. The event notification notifies an entity of an event of interest to the entity. The event having been detected from one or more normalized signals normalized from a corresponding one or more raw signals.

The event notification is audited. Auditing includes accessing one or more raw signals used to derive the one or more normalized signals, the one or more normalized signals, the event, and the event notification from a distributed ledger. Auditing includes verifying the integrity of the one or more raw signals, the one or more normalized signals, the event, and the event notification through reference to the distributed ledger. An entity resource is allocated based on being notified of the occurrence of the event and the verified integrity of the one or more raw signals, the one or more normalized signals, the event, and the event notification.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
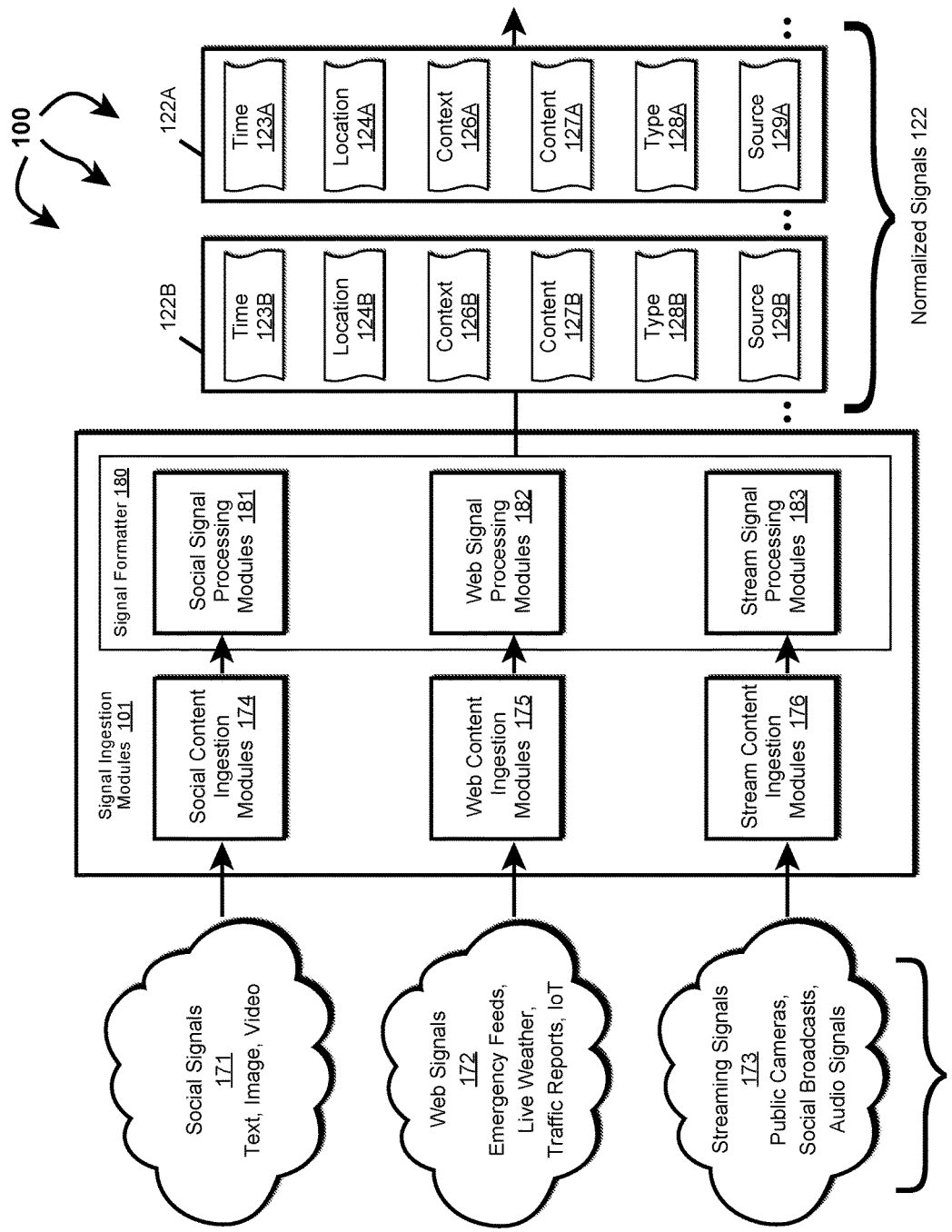
FIG. 1A illustrates an example computer architecture that facilitates normalizing ingesting signals.

Examples extend to methods, systems, and computer program products for storing and verifying the integrity of event related data.

Entities (e.g., parents, guardians, teachers, social workers, first responders, hospitals, delivery services, media outlets, government entities, etc.) desire to be made aware of relevant events as close as possible to the events' occurrence (i.e., as close as possible to "moment zero"). Event relevancy can differ between entities and may be based on entity specific desires. For example, parents may be interested in any police presence at or near their children's school. However, the parents are not necessarily interested in police presence in other places. As another example, an ambulance service may be interested in motor vehicle accidents with injuries that occur within their area of operation. However, the ambulance service is not necessarily interested in accidents without injuries or accidents that occur outside their area of operation.

In general, signal ingestion modules ingest different types of raw structured and/or raw unstructured signals on an ongoing basis. Different types of signals can include different data media types and different data formats, including Web signals. Different types of signals can include different data media types and different data formats. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. Signal features can include: signal type, signal source, signal content, Time (T) dimension, Location (L) dimension, Context (C) dimension, other circumstances of signal creation, etc.

To facilitate auditing and traceability, raw signals, normalized signals, detected events, event expirations, and event notifications can be stored in a queryable distributed ledger (e.g., a blockchain). The distributed ledger can implement anti tampering mechanisms based on cryptography to significantly limit, and potentially eliminate, alteration of data stored in the distributed ledger. Personal information can be stripped (or otherwise rendered inert, for example, unrecognizable, unreproducible, etc.) prior to storage into the distributed ledger. Preventing access to personal information minimizes the possibility of a person being identified. Personal information can be replaced with other identifiers, such as, hashes.

Generally, raw signals, normalized signals, events, event expirations, event notifications, etc. can be audited and issues investigated, diagnosed and remediated through reference to the distributed ledger. When errors or inconsistencies occur during processing, detection, or delivery, of raw signals, normalized signals, events, or notifications, the ledger can be queried to access relevant data. The relevant data can be used for forensics purposes, for example, to audit data, recreate events, etc., in view of an error or inconsistency to investigate, diagnose, remediate, etc. For example, when an inconsistency is identified for a detected event (e.g., an incorrect time is assigned to an event), the event and the set of signals providing the basis for detecting the event can be accessed from the distributed ledger. The event and the set of signals can be examined. The set of signals can also be used to recreate an event purported to be the detected event. The contents of the recreated event can be compared to the detected event.

Accordingly, aspects of the invention provide transparency into processing raw signals and normalized signals, event detection, event notification, and event expiration without compromising personal information.

In this description and the following claims, "personal information" is described as one or more portions of data that when considered individually or in the aggregate relate to the identity of a natural person or can be used to identify a natural person. Personal information is defined to include personally identifiable information (PII), sensitive personal information (SPI), or other information that can be used on its own or with other information to identify, contact, or locate a single person, or to identify an individual in context. Personal information can include but is not limited to: full name, first name, last name, home address (or portions thereof), email address, nation identification number, passport number, vehicle registration plate, driver's license, face, fingerprints, handwriting, credit card numbers, digital identity, date of birth, birthplace, login name, social media identifier, mobile telephone number, nickname, age, gender, employer, school name, criminal record, job position, etc.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, personal information, profile IDs, signal content, images, audio clips, text, normalized signals, hashes, obscured personal information, events, event notifications, event expirations, distributed ledgers, distributed ledger blocks, distributed ledger links, queries, ledger data, recreations, simulations, event evolutions, event verification requests, verifications, resource allocations, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, personal information, profile IDs, signal content, images, audio clips, text, normalized signals, hashes, obscured personal information, events, event notifications, event expirations, distributed ledgers, distributed ledger blocks, distributed ledger links, queries, ledger data, recreations, simulations, event evolutions, event verification requests, verifications, resource allocations, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geohash Precisions

| Geohash Length/Precision | width × height |
| --- | --- |
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km²) to level 30 (between 0.48 cm² to 0.96 cm²).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or preprocess) raw signals into normalized signals to increase efficiency and effectiveness of subsequent computing activities, such as, event detection, event notification, etc., that utilize the normalized signals. For example, signal ingestion modules can normalize raw signals, including raw streaming signals, into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In additional aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) on going basis and in essentially real-time. Signal ingestion module(s) 101 include social content ingestion modules 174, web content ingestion modules 175, stream content ingestion modules 176, and signal formatter 180. Signal formatter 180 further includes social signal processing module 181, web signal processing module 182, and stream signal processing modules 183.

Streaming signals 173 can include live video and/or non-live (previously stored) video.

For each type of signal, a corresponding ingestion module and signal processing module can interoperate to normalize the signal along Time, Location, Context (TLC) dimensions. For example, social content ingestion modules 174 and social signal processing module 181 can interoperate to normalize social signals 171 into TLC dimensions. Similarly, web content ingestion modules 175 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can utilize "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity and resource consumption of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time (dimension) 123A, location (dimension) 124A, context (dimension) 126A, content 127A, type 128A, and source 129A to event detection infrastructure 103. Similarly, signal ingestion modules 101 can send normalized signal 122B, including time (dimension) 123B, location (dimension) 124B, context (dimension) 126B, content 127B, type 128B, and source 129B to event detection infrastructure 103.

Event Detection

Figure 1B:
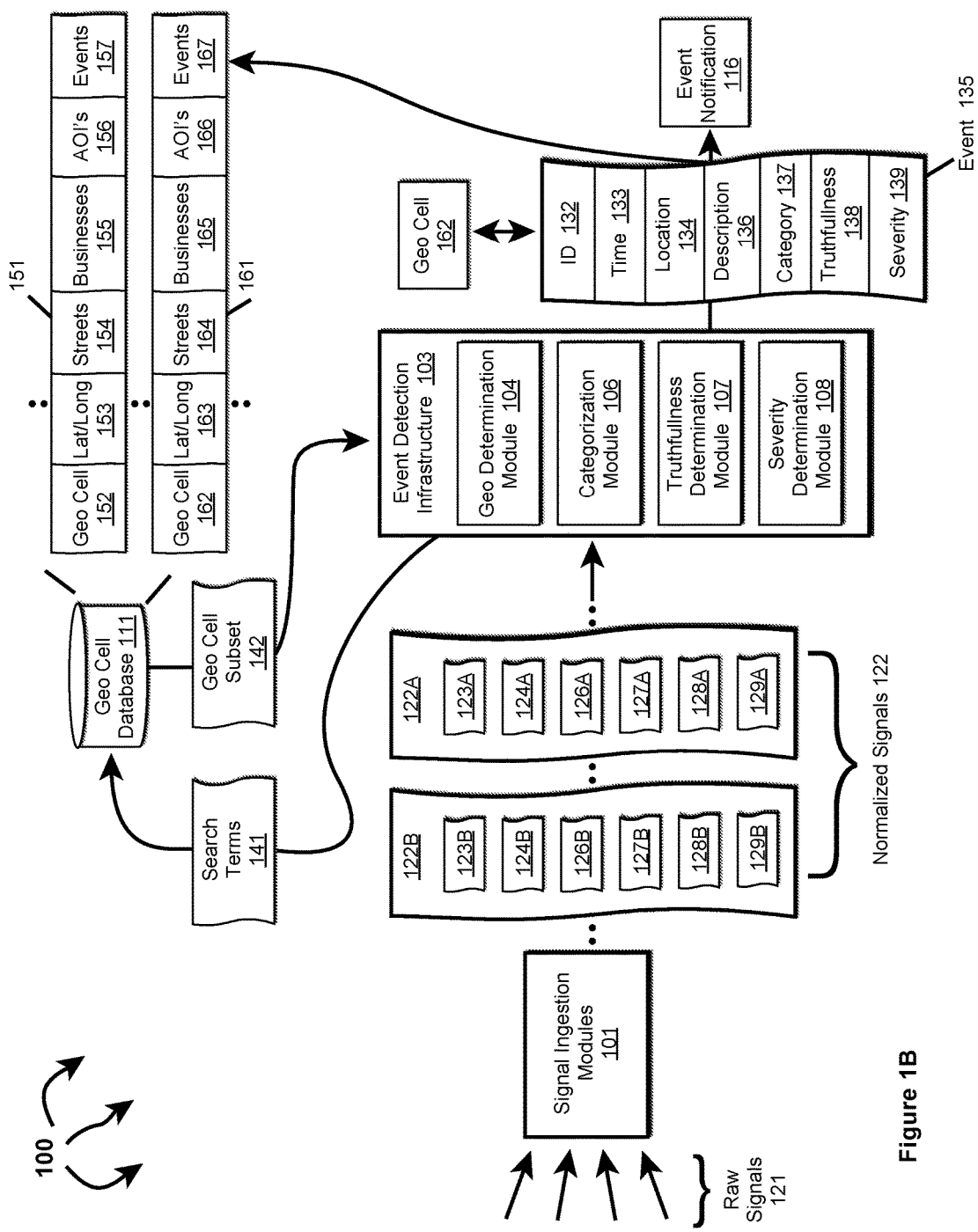
FIG. 1B illustrates an example computer architecture that facilitates detecting events from normalized signals.

FIG. 1B depicts part of computer architecture 100 that facilitates detecting events. As depicted, computer architecture 100 includes geo cell database 111 and even notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis and concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Event detection infrastructure can likewise detect changes to existing (planned and unplanned) events. Since, normalized signals are normalized to include Time, Location, and Context dimensions (vectors), event detection infrastructure 103 can handle normalized signals in a more uniform manner. Handling signals in a more uniform manner increases event detection and event change detection efficiency and effectiveness and also reduces resource consumption. For example, Time, Location, and Context vectors of different normalized signals can be compared (instead of comparing along numerous, and possibly differing and/or non-uniform, other dimensions).

Event detection infrastructure 103 can also determine an event truthfulness (e.g., erroneous detection results, detections based on tampered source data, detections of fictional or staged events), event severity, and an associated geo cell. In one aspect, context information in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension and/or can be represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension and/or can be represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field). Sufficiently precise geo cells can be used to increase the practicality of storing matching content.

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Storing Signal and Event Related Data in a Distributed Ledger

Figure 2:
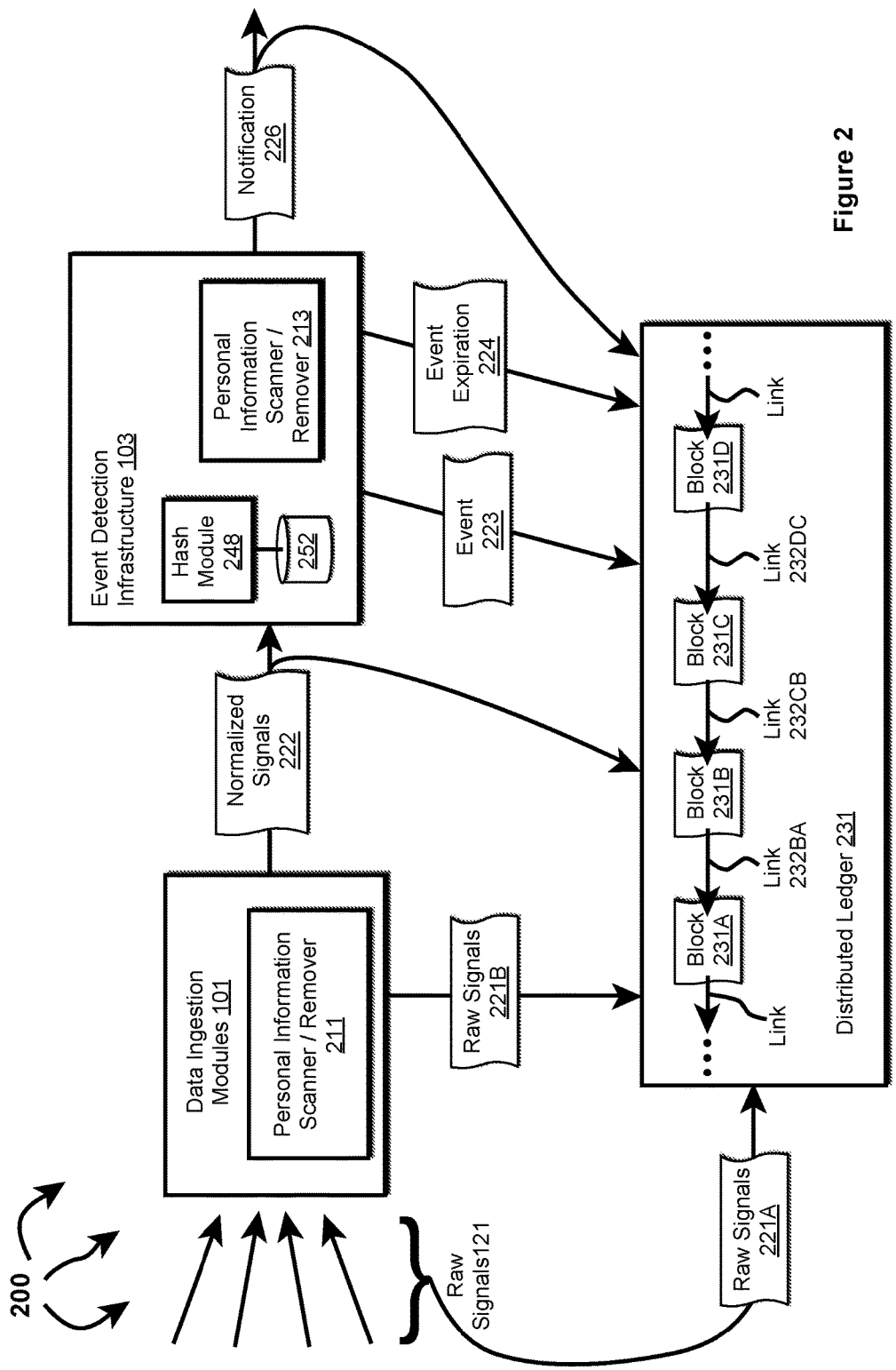
FIG. 2 illustrates an example computer architecture that facilitates storing signal and event related data in a distributed ledger.

FIG. 2 illustrates an example computer architecture 200 that facilitates storing signal and event related data in a distributed ledger. As depicted, computer architecture 200 includes distributed ledger 231 (e.g., a blockchain). Distributed ledger 231 can include a continuously growing list of blocks which are linked and secured using cryptography. Each block can include a cryptographic hash of the previously block, a timestamp, and transaction data (e.g., signals, normalized signals, events, event notifications, event expirations, etc.). For example, link 232DC links block 231D back to block 231C and includes a hash of block 231C. Link 232 CB links block 231C back to block 231B and includes a hash of block 231B. Link 232 BA links block 231B back to block 231A and includes a hash of block 231A. Other links connect the depicted blocks to other blocks including in distributed ledger 231.

As depicted, data ingestion modules 101 further include personal information scanner/remover 211. Personal information scanner/remover 211 can scan raw signals and/or normalized signals for personal information. Personal information scanner/remover 211 can strip identified personal information from raw and/or normalized signals or can otherwise render identified personal information inert. For example, text can be deleted, portions of an image obscured, or portions of an audio clip rendered unintelligible.

In one aspect, personal information scanner/remover 211 prevents further access to virtually all personal information identified in raw signals and/or normalized signals. In another aspect, personal information scanner/remover 211 prevents further access to some, but not all, personal information identified in raw signals and/or normalized signals. For example, personal information usable to formulate a temporal identifier for a signal source can remain in a signal.

Data ingestion modules 101 can store raw signals and normalized signals, with at least some personal information removed, in one or more blocks of distributed ledger 231. Data ingestion modules 101 can store a normalized signal along with an indication of the corresponding raw signal from which the normalized signal was derived. Data ingestion modules 101 can also send normalized signals, with at least some personal information removed, to event detection infrastructure 103.

Personal information scanner/remover 211 can be included in, integrated with, and/or interoperate with other modules of data ingestions modules 101 including social content ingestion modules 174, web content ingestion modules 175, stream content ingestion modules 176, signal formatter 180, social signal processing modules 181, web signal processing modules 182, and stream signal processing modules 183. As such, data ingestion modules 101 can scan for, identify, and prevent further access to personal information at virtually any stage of, and possibly at multiple different stages, of signal normalization.

Generally, event detection infrastructure 103 can detect events, notify entities of occurring events, and track when events expire. As depicted, event detection infrastructure 103 further includes personal information scanner/remover 213, hash module 248, and hash storage 252. Personal information scanner/remover 213 can strip identified personal information from any of normalized signals, detected events, event notifications, event expirations, etc. or can otherwise render identified personal information inert. For example, text can be deleted, portions of an image obscured, or portions of an audio clip rendered unintelligible.

In one aspect, personal information scanner/remover 213 prevents further access to virtually all personal information in normalized signals, detected events, event notifications, event expirations, etc. In another aspect, personal information scanner/remover 213 prevents further access to some, but not all, personal information in normalized signals, detected events, event notifications, event expirations, etc. For example, personal information can be transformed into a temporal identifier for a signal source.

Event detection infrastructure 103 can store normalized signals, detected events, event notifications, event expirations, etc., with at least some personal information removed, in one or more blocks of distributed ledger 231. Event detection infrastructure 103 can store a detected event along with an indication of one or more normalized signals associated with the detected event (with personal information stripped from the detected event and the one or more normalized signals). Event detection infrastructure 103 can store event notifications and event expirations in one or more blocks of distributed ledger 231. Event detection infrastructure 103 can also send event notifications and event expirations to relevant entities.

Personal information scanner/remover 211 and/or personal information scanner/remover 213 can include various analysis modules for analyzing different types of content for personal information. For example, personal information scanner/remover 211 and/or personal information scanner/remover 213 can include text analysis modules, audio analysis modules, image analysis modules, video analysis modules, etc. Audio analysis modules can analyze sound clips for personal information, image analysis modules can analyze images for personal information, text modules can analyze text for personal information, etc.

In some aspects, personal information is detected from different parts of a portion of content (e.g., different parts of an image) considered in the aggregate. In other aspects, personal information is detected from parts of different portions of content (e.g., text and an image). The analysis modules can remove detected personal information from signal content or render the personal information otherwise inert. For example, text can be deleted, portions of an image obscured, or portions of an audio clip rendered unintelligible.

Hash module 248 is configured to identify (e.g., social media) profile identifiers contained in normalized signals. Hash module 248 can use a hashing algorithm to hash the profile identifier into a hash (e.g., a temporal identifier). The temporal identifier can be stored in hash storage 252 and the profile identifier removed from the normalized signal. As such, event detection infrastructure 103 can store a detected event, including the temporal identifier, along with an indication of corresponding normalized signals from which the event was detected and with other personal information stripped out (or otherwise rendered inert) in one or more blocks of distributed ledger 231.

Subsequently, hash module 248 can identify another (e.g., social media) profile identifier contained in another normalized signal. Hash module 248 uses the hashing algorithm to hash the other profile identifier into another hash (i.e., another temporal identifier). Hash module 248 compares the hash to the other hash. If the hashes match, hash module 248 considers the normalized signal and other normalized signal to have originated from the source. As such, the event detection infrastructure treats the normalized signal and other normalized signal as a single normalized signal (and thus reduces the contribution of the other normalized signal to any events detected based on the signal). Event detection infrastructure 103 can also store a linkage between normalized signals originating from the same source in one or more blocks of distributed ledger 231.

The lifetime of a detected event can vary. In one aspect, the lifetime of an event is between 15 and 120 minutes. For example, police presence at a location (can range from a few minutes to a couple hours (e.g., to clear an accident). In another aspect, the lifetime of an event is between 5 minutes and a day. For example, a protest may last an entire day. Events can also be multi-day ongoing events. Thus, in a further aspect, the lifetime of an event is between 1 minute and 1 week (or even longer). For example, natural disasters can last for days (e.g., hurricanes) or weeks (e.g., forest fires). Event detection infrastructure 103 can maintain a hash (or other temporal identifier) for some amount of time (e.g., 5, 10, or 15 minutes) after the lifetime of an event expires. Event detection infrastructure 103 can also store an indication of when a detected event expired in one or more blocks of distributed ledger 231. Hash module 248 can remove a corresponding hash from hash storage 152 when an event expires.

Accordingly, contents of distributed ledger 231 provide sufficient information for tracing the evolution of a detected event from initially received raw signals to event detection through to event expiration.

Personal information scanner/remover 213, hash module 248, and hash storage 252 can be included in, integrated with, and/or interoperate with other modules of event detection infrastructure 103 including geo determination module 104, categorization module 106, truthfulness determination module 107, and severity determination module 108. As such, event detection infrastructure 103 can scan for, identify, and prevent further access to personal information at virtually any stage of, and possibly at multiple different stages, of event detection, event notification, and event expiration.

In one aspect, one or more signal sources independently store raw signals in distributed ledger 231. A signal source can store raw signals in distributed ledger 231 in combination with or in the alternatively to sending raw signals to data ingestion modules 101. For example, one or more signal sources can store raw signals 221A (a subset of raw signals 121) in distributed ledger 231. When appropriate, data ingestion modules 101 can access raw signals from distributed ledger 231 for normalization.

Figure 3:
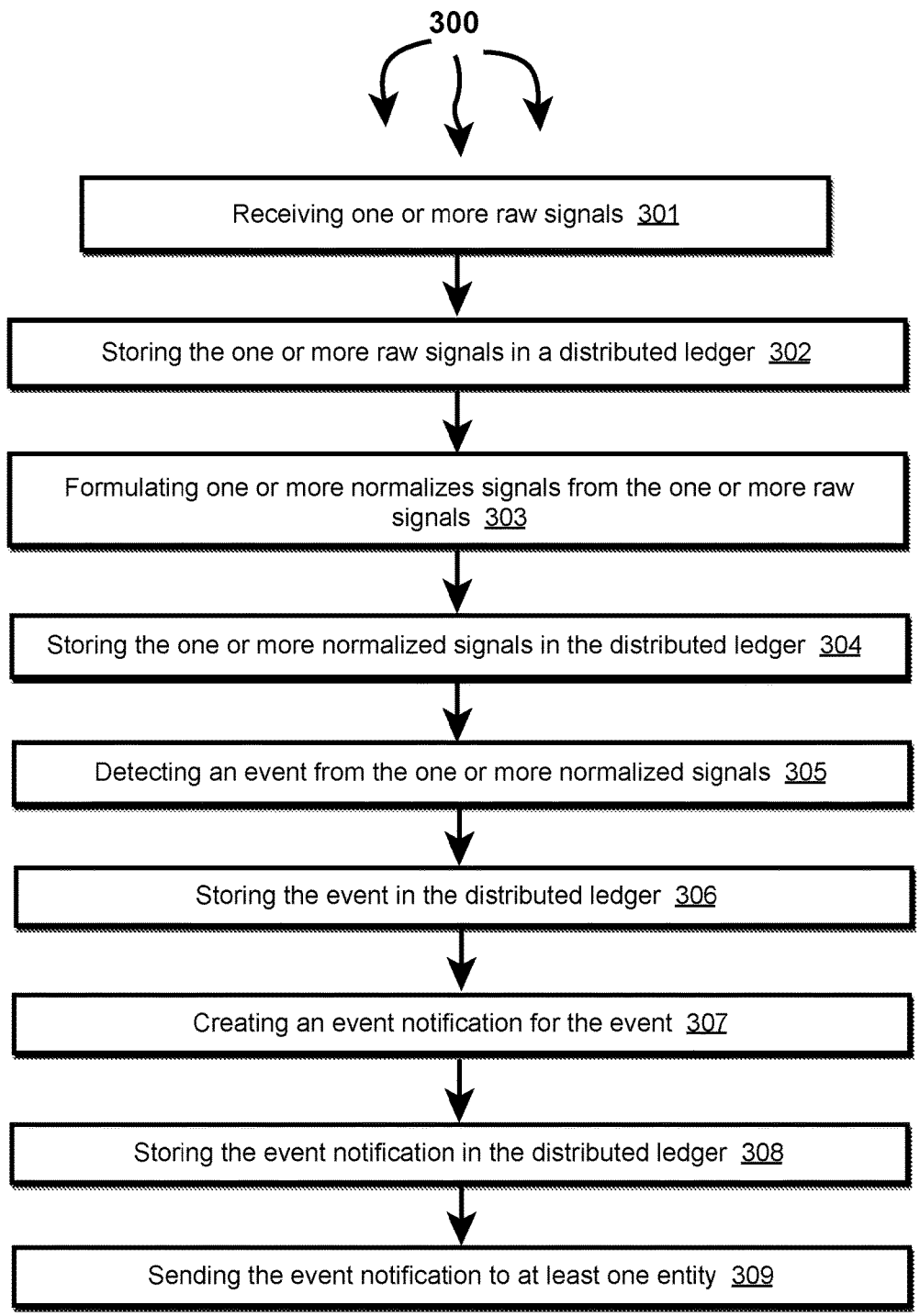
FIG. 3 illustrates a flow chart of an example method for storing signal and event related data in a distributed ledger.

FIG. 3 illustrates a flow chart of an example method 300 for storing signal and event related data in a distributed ledger. Method 300 will be described with respect to the components and data in computer architecture 200.

Method 300 includes receiving one or more raw signals (301). For example, data ingestion modules 101 can receive raw signals 121B (a subset of raw signals 121). Method 300 includes storing the one or more raw signals in a distributed ledger (302). For example, data ingestion modules 101 can store raw signals 221B in in one or more blocks of distributed ledger 231. In one aspect, personal information scanner/remover 211 strips (or renders otherwise inert) at least some personal information from one or more of raw signals 221B prior to storage.

Method 300 includes formulating one or more normalized signals from the one or more raw signals (303). For example, data ingestion modules 101 can formulate normalized signals 222 from raw signals 221B. Method 300 includes storing the one or more normalized signals in the distributed ledger (304). For example, data ingestion modules 101 can store normalized signals 222 in one or more blocks of distributed ledger 231. In one aspect, personal information scanner/remover 211 strips (or renders otherwise inert) at least some personal information from one or more of normalized signals 222 prior to storage.

Method 300 includes detecting an event from the one or more normalized signals (305). For example, event detection infrastructure 103 can detect event 223 from normalized signals 222. Method 300 includes storing the event in the in the distributed ledger (306). For example, event detection infrastructure 103 can store event 223 in one or more blocks of distributed ledger 231. In one aspect, personal information scanner/remover 213 strips (or renders otherwise inert) at least some personal information included in event 223 prior to storage.

Method 300 includes creating an event notification for the event (307). For example, event detection infrastructure 103 can create event notification 226 for event 223. Method 300 includes storing the event notification in the distributed ledger (308). For example, event detection infrastructure 103 can store event notification 226 in one or more blocks of distributed ledger 231. Method 300 includes sending the event notification to at least one entity (309). For example, event detection infrastructure 103 can send notification 226 to an entity. In one aspect, personal information scanner/remover 213 strips (or renders otherwise inert) at least some personal information included in notification 226 prior to storage and/or sending to an entity.

Subsequently, when event 223 expires, event detection infrastructure 103 can formulate event expiration 224. Event detection infrastructure 103 can store event expiration 224 in one or more blocks of distributed ledger 231 and send event expiration 224 to the entity. In one aspect, personal information scanner/remover 213 strips (or renders otherwise inert) at least some personal information included in event expiration 224 prior to storage and/or sending to an entity.

Validating An Event

Figure 4:
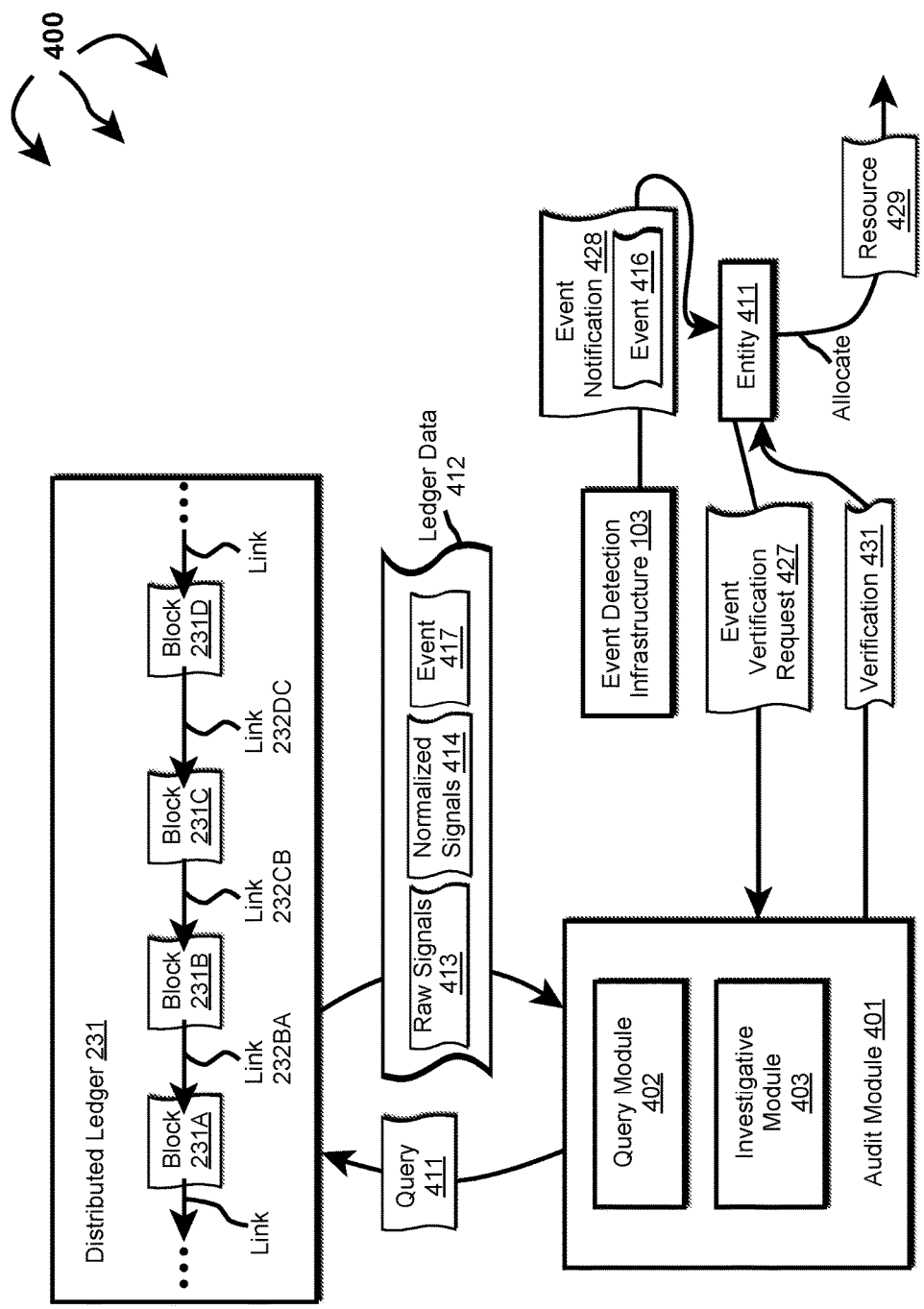
FIG. 4 illustrates an example computer architecture that facilitates validating an event.

Upon receiving notification of an event, a notified entity may wish to verify an event prior to allocating resources to address the event. FIG. 4 illustrates an example computer architecture 400 that facilitates validating an event. As depicted, computer architecture 400 further includes audit module 401 and entity 411. Audit module 401 includes query module 402 and investigative module 403.

Audit module 401 can access data from distributed ledger 231 to verify events as well as investigate, diagnose, and remediate detected inconsistencies or errors in any of raw signals, normalized signals, events, event notifications, and event expirations. Query module 402 can query distributed ledger 231 for ledger data related to a detected event or related to an indicated inconsistency or error (e.g., a time zone glitch, language parsing error, etc.). Distributed ledger 231 can return ledger data back to query module 402.

Investigative module 403 can use ledger data to attempt to recreate a detected event or set of activities that led to the inconsistency or error. In one aspect, investigative module 403 follows the evolution of an event from raw signal reception through to event detection to validate an event.

For example, investigative module 403 can simulate (recreate) normalization a set of raw signals into a corresponding set of normalized signals. Investigative module 203 can then compare the simulated (recreated) set of normalized signals to the actual normalized signals contained in distributed ledger 231. Investigative module 403 can then simulate (recreate) detection of an event from a set of normalized signals. Investigative module 203 can then compare the simulated (recreated) event to the actual event. When simulated (recreated) data does not match actual data, further measures can be taken to determine and/or correct the cause of a mismatch.

When signal sources store raw signals (e.g., raw signals 221) directly to distributed ledger 231. Data ingestion module(s) 101 can use audit module 401 to validate the integrity of raw signals received from the signal sources.

Figure 5:
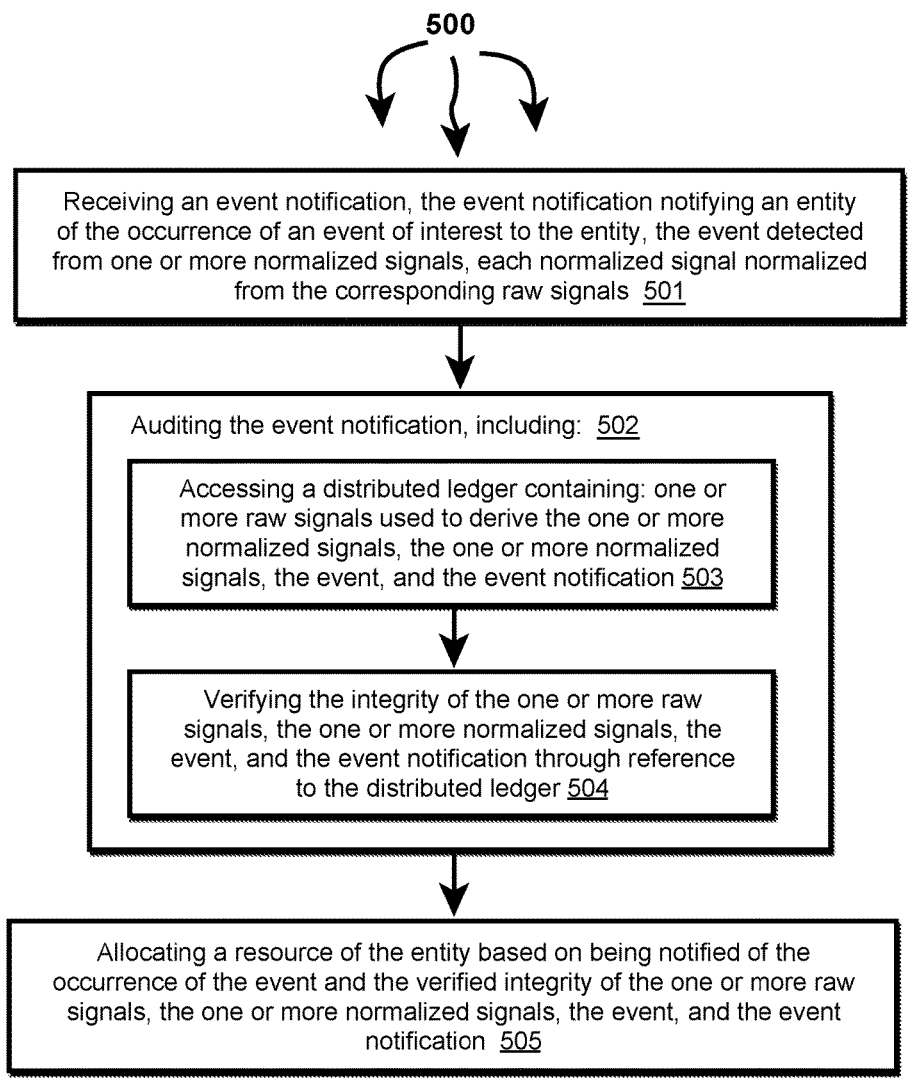
FIG. 5 illustrates a flow chart of an example method for validating an event.

FIG. 5 illustrates a flow chart of an example method 500 for validating an event. Method 500 will be described with respect to the components and data depicted in computer architecture 400.

Method 500 includes receiving an event notification, the event notification notifying an entity of the occurrence of an event of interest to the entity, the event detected from one or more normalized signals, each normalized signal normalized from a corresponding raw signal (501). For example, event detection infrastructure 103 can formulate event notification 428 to notify an entity about event 416. Event detection infrastructure 103 can send event notification 428 to entity 411. Entity 411 can receive event notification 428 from event detection infrastructure 103. Event notification 428 can notify entity 411 of event 416 (an event of interest to entity 411). Event 416 can be an event that was detected from one or more normalized signals (e.g., in normalized signals 222) that were normalized from corresponding raw signals (e.g., in raw signals 221A and/or in raw signals 221B). It may be that ingestion modules 101 previously stored the one or more raw signals and the one or more normalized signals in distributed ledger 231. It may also be that event detection infrastructure 103 previously stored event 416 in distributed ledger 231.

Entity 411 can control resources with capabilities to mitigate physical danger associated with event 416. For example, a fire department can have resources (e.g., fire trucks, fire fighters, etc.) capable of extinguishing a fire. However, entity 411 may be hesitant to deploy such resources without verification of event 416.

Method 500 includes auditing the event notification (502). For example, audit module 401 can audit event notification 428.

Auditing the event notification includes accessing a distributed ledger containing: one or more raw signals used to derive the one or more normalized signals, the one or more normalized signals, the event, and the event notification (503). For example, entity 411 can send event verification request 427 to audit module 401. Query module 402 can formulate query 411 (a query for ledger data related to event notification 428) from event verification request 427. Query module 402 can send query 411 to distributed ledger 231. In response to query 411, distributed ledger 231 can return ledger data 412 including raw signals 413, normalized signals, 414, and event 417. Any of signals 413, normalized signals, 414, and event 417 can have at least some personal information stripped or otherwise rendered inert.

Raw signals 413 can be raw signals allegedly used to derive normalized signals 414. Normalized signals 414 can be normalized signals allegedly used to detect event 417. Event 417 can be an event that allegedly triggered creating and sending event notification 428.

Auditing the event notification includes verifying the integrity of the one or more raw signals, the one or more normalized signals, the event, and the event notification through reference to the distributed ledger (504). For example, investigative module 403 can verify the integrity of raw signals 413, normalized signals 414, event 417, and event notification 428.

To verify raw signals 413, investigative module 403 can simulate (recreate) normalizing raw signals 413 into normalized signals. Investigative module 403 compares the simulated (recreated) normalized signals to normalized signals 414. Investigative module 403 verifies the integrity of raw signals 413 when the simulated (recreated) normalized signals match normalized signals 414.

To verify normalized signals 414, investigative module 403 can simulate (recreate) detecting an event from normalized signals 414. Investigative module 403 compares the simulated (recreated) detected event to event 417. Investigative module 403 verifies the integrity of normalized signals 414 when the simulated (recreated) detected event matches event 417.

To verify event 416, investigative module 403 can compare event 416 to event 417. Investigative module 403 verifies the integrity of event 416 when event 416 matches event 417.

To verify event 416, investigative module 403 can also simulate creating (recreate) an event notification for event 416. Investigative module 403 compares the simulated (recreated) event notification to event notification 428. Investigative module 403 verifies the integrity of event notification 428 when the simulated (recreated) event notification matches event notification 428.

Thus, investigative module 403 essentially traces the evolution of event 416 from raw signals 413 through normalized signals 414 to event detection based on ledger data 412. Audit module 401 can return verification 431 to entity 411. Verification 431 indicates that investigative module 403 verified the integrity of raw signals 413, normalized signals 414, and event 416. Entity 411 can receive verification 431 from audit module 401.

Method 500 includes allocating a resource of the entity based on being notified of the occurrence of the event and the verified integrity of the one or more raw signals, the one or more normalized signals, the event, and the event notification (505). For example, entity 411 can allocate resource 429 in response to receiving event notification 428 and verification 431. In one aspect, resource 429 and/or allocation of resource 429 is tailored to event 416 based on characteristics of event 416, such as, for example, location, description, severity, category, etc. Resource 429 can be a physical resource, such as, a patrol vehicle, an ambulance, first responder personnel, search and rescue, etc.

Investigative module 403 can include additional algorithms for identifying errors, inconsistencies, etc. between ledger data and other event related data. Additional algorithms can be invoked when simulated normalized signals, events, event notifications, event expirations, etc. do not match actual normalized signals, events, event notifications, event expirations, etc.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer-implemented method of validating event notifications in a distributed ledger, the computer-implemented method comprising:
receiving an event notification, wherein the event notification notifies an entity of the occurrence of an event of interest to the entity detected from one or more normalized signals, and wherein each normalized signal is normalized from a corresponding raw signal;
auditing the event notification, including:
accessing the distributed ledger containing:
one or more raw signals used to derive the one or more normalized signals, the one or more normalized signals, the event, and the event notification, wherein accessing the distributed ledger comprises accessing a Blockchain; and
verifying the integrity of the one or more raw signals, the one or more normalized signals, the event, and the event notification through reference to the distributed ledger, including:
simulating detection of a simulated event from the one or more normalized signals, and
comparing the event to the simulated event; and
allocating a first responder resource of the entity based on being notified of the occurrence of the event and based on the integrity verification.

2. The method of claim 1, further comprising stripping personal information from the one or more raw signals and storing the one or more raw signals in the distributed ledger.

3. The method of claim 1, further comprising stripping personal information from the one or more normalized signals and storing the one or more normalized signals in the distributed ledger.

4. The method of claim 1, further comprising stripping personal information from the event and storing the event in the distributed ledger.

5. The method of claim 1, further comprising stripping personal information from the event notification.

6. The method of claim 1, further comprising:
creating an event expiration for the event; and
storing the event expiration in the distributed ledger.

7. The method of claim 1, wherein verifying the integrity of the one or more raw signals, the one or more normalized signals, the event, and the event notification through reference to the distributed ledger comprises:
simulating normalization of the one or more raw signals into one or more simulated normalized signals; and
comparing the one or more normalized signals to the one or more simulated normalized signals.

8. A system of validating event notifications in a distributed ledger, the system comprising:
a processor;
system memory coupled to the processor and storing instructions configured to cause the processor to:
receive an event notification, wherein the event notification notifying an entity of the occurrence of an event of interest to the entity detected from one or more normalized signals, and wherein each normalized signal is normalized from a corresponding raw signal;
audit the event notification, including:
access the distributed ledger containing:
one or more raw signals used to derive the one or more normalized signals, the one or more normalized signals, the event, and the event notification, wherein accessing the distributed ledger comprises accessing a Blockchain; and
verify the integrity of the one or more raw signals, the one or more normalized signals, the event, and the event notification through reference to the distributed ledger, including:
simulate detection of a simulated event from the one or more normalized signals; and
compare the event to the simulated event; and
allocate a first responder resource of the entity based on being notified of the occurrence of the event and based on the integrity verification.

9. The system of claim 8, further comprising instructions configured to strip personal information from the one or more raw signals and store the one or more raw signals in the distributed ledger.

10. The system of claim 8, further comprising instructions configured to strip personal information from the one or more normalized signals and store the one or more normalized signals in the distributed ledger.

11. The system of claim 8, further comprising instructions configured to strip personal information from the event and store the event in the distributed ledger.

12. The system of claim 8, further comprising instructions configured to strip personal information from the event notification.

13. The system of claim 8, wherein instructions configured to verify the integrity of the one or more raw signals, the one or more normalized signals, the event, and the event notification through reference to the distributed ledger comprises instructions configured to:
simulate normalization of the one or more raw signals into one or more simulated normalized signals; and
compare the one or more normalized signals to the one or more simulated normalized signals.

14. The system of claim 8, wherein instructions configured to access a distributed ledger comprise instructions configured to access a blockchain.

15. The system of claim 8, wherein instructions configured to allocate a resource comprise instructions configured to allocate a first responder resource.

* * * * *